July 4, 1933.   J. A. SPENCER   1,916,498
TEMPERATURE CONTROLLED APPARATUS
Original Filed April 3, 1925
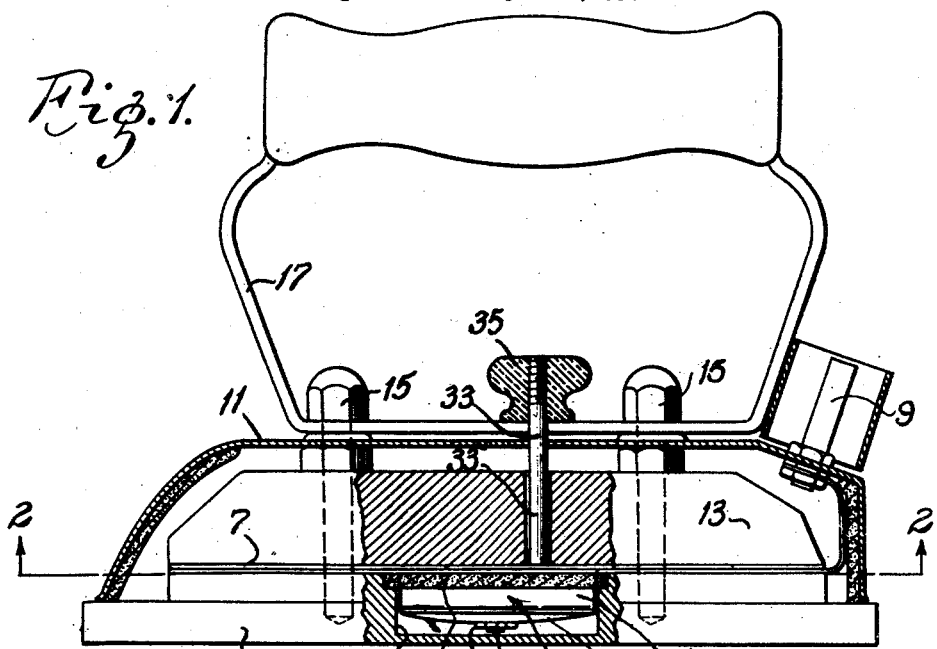
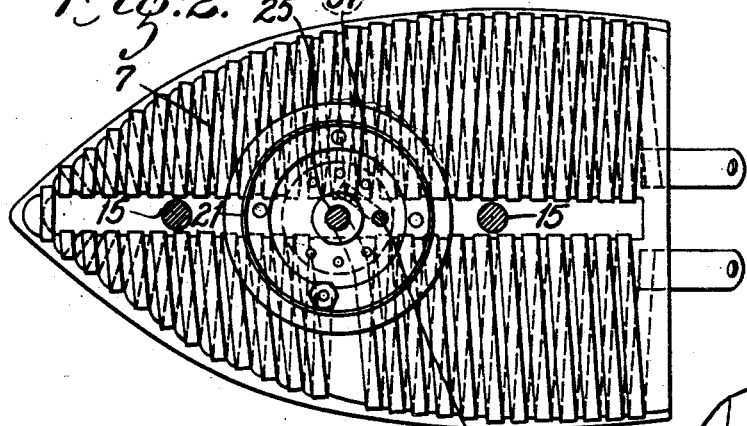
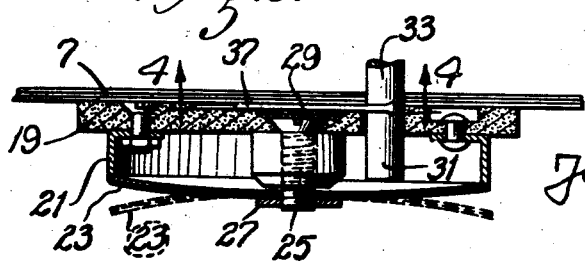
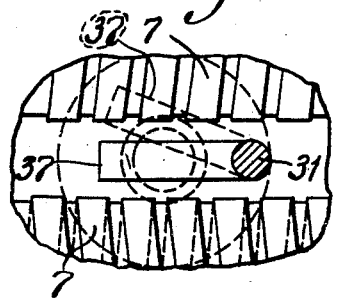
John A. Spencer, Inventor.

Patented July 4, 1933

1,916,498

UNITED STATES PATENT OFFICE

JOHN A. SPENCER, OF NEWTONVILLE, MASSACHUSETTS, ASSIGNOR TO SPENCER THERMOSTAT COMPANY, OF CAMBRIDGE, MASSACHUSETTS, A CORPORATION OF MASSACHUSETTS

TEMPERATURE CONTROLLED APPARATUS

Original application filed April 3, 1925, Serial No. 20,455. Divided and this application filed December 5, 1930. Serial No. 500,213.

This invention relates to temperature controlled apparatus, and with regard to certain more specific features, to a thermostatically controlled sadiron.

This application is a division of my United States application Serial No. 20,455, filed April 3, 1925 for "Temperature-controlled apparatus" now Patent No. 1,812,722, dated June 30, 1931.

As disclosed in my United States Patent 1,448,240, dated March 13, 1923, the electrical heating circuit of a sadiron may be suddenly opened when the sidiron reaches a predetermined temperature limit and automatically closed when the temperature of the iron drops to a certain predetermined lower limit. Such a control is accomplished by the use of a snap-acting thermostatic member which suddenly and abruptly changes shape at predetermined temperature limits.

Among the several objects of the present invention may be noted the provision of a thermostatically operated sadiron in which the temperatures at which the thermostat operates may be varied without adjusting the thermostat itself; the provision of a device of the class described in which there is provided means for regulating the temperature of the thermostatic control independent of the temperature of the sadiron itself so that the heater circuit of the iron will be automatically opened and closed at predetermined temperature limits of the iron; the provision of a device of the class described in which there is provided means for transmitting predetermined amounts of heat to a space surrounding a thermostatic member so that said thermostatic member will automatically open and close the circuit of the heating element from which heat is transmitted; and the provision of a device of the class described which is simple, effective, and adapted to a wide variety of uses. Other objects will be in part obvious and in part pointed out hereinafter.

This invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a longitudinal section of a sadiron, parts being shown in elevation;

Fig. 2 is a horizontal section taken substantially upon line 2—2 of Fig. 1;

Fig. 3 is an enlarged, detailed section of the means for controlling the temperature of a thermostatic disk; and, Fig. 4 is a view taken on line 4—4 of Fig. 3.

Similar reference characters indicate corresponding parts throughout the several views of the drawings.

Referring now more particularly to the drawings, there is represented at numeral 1 a base member having a recess 3 formed therein, in which the thermostatic assembly indicated at 5 is located. The base member 1 is surmounted by a flat heating coil 7 which is connected to a terminal plug 9 mounted upon the sheet metal shell 11. The heating coil 7 is surmounted by a weight member 13 and the several parts are retained in assembled position by bolts 15, which also hold in place a handle 17.

As shown in Figs. 1 and 3, the recess 3 is closed by a disk 19 of insulating material which carries a stationary contacting ring 21 cooperating with a thermostatic disk 23. The thermostatic disk is mounted upon a supporting stem 25 which may be molded into the disk 19 and is held in place thereon by a nut 27. The electric heating circuit comprises a series connection of the stationary contacting ring 21, the thermostatic disk 23, stem 25 and the heating coil 7, a thin contact plate 29 connecting one terminal of the heating coil 7 to the supporting stem 25.

It will be clear from the construction shown that the temperature of the thermostatic disk normally approximates the temperature of the base member 1. The temperature of the disk may be separately controlled, however, by the provision of means for carrying predetermined amounts of heat to the space surrounding the disk. This means of transmitting a quantity of heat to the space 3 may conveniently comprise a member 31 of relatively small cross section which projects downward into the recess 3. The member 31 is provided with an arm 37 extending laterally therefrom and which is in variable heat conducting relation with a portion of the heating coil as shown in Fig. 4. If the member 31 and arm 37 are formed of metal having a relatively high thermal conductivity, heat will flow from the coil 7 through the arm 37 into the projecting end 31 by conduction and thus be transmitted to the thermostatic disk in part by radiation from the projecting end of member 31 and by conduction from the surrounding air which has been heated by the conduction of heat from the coil 7 to this surrounding air by means of the arm 37 and the member 31. There is therefore provided a simple and effective means for conducting a predetermined amount of heat from the heating element to the thermostat.

The member 31 is also provided with a stem portion 33 which extends upward through the weight member 13 and shell 11. A control knob 35 is affixed to the projecting end of the stem 33. The turning of the knob 35 provides a means for varying the area of contact of the arm 37 with the heating coil 7, altering thereby the rate of transmission of heat to the thermostat, serving thereby to change the temperature of the thermostatic disk with respect to the surrounding base of the sadiron.

It is to be understood that the thermostatic disk 23 has substantially fixed temperature limits at which it suddenly and abruptly reverses its curvature and that the circuit of the heating coil 7 is opened when the thermostat reaches its upper temperature limit. Although the thermostat is in heat conducting relation to the base member 1 it is clear that the provision of a variable means for transmitting heat to the thermostat will cause the thermostat to reach its operating temperature substantially before the base member 1 reaches a temperature equal to the operating temperature of the thermostat, and that the temperature of the base member 1 at which the heating circuit is opened may be varied by adjustment of the knob 35. It is therefore clear that the adjustment of this knob 35 determines the upper temperature limit of the sadiron. The flow of heat is adjusted by varying the conduction thereof through the stem 31.

The lower temperature limit of the sadiron is also determined by the thermostat. When the thermostat has reached its upper temperature limit and has snapped to the dotted-line position shown in Fig. 3, the current flow through the heating coil 7 is broken and the temperature of the sadiron and the thermostat begins to fall. When the temperature of the thermostat falls to its lower operating temperature, the thermostat snaps to the full-line position of Fig. 3 and the circuit through the heating coil 7 is closed.

It is therefore clear that there is provided a means for regulating the temperature of the sadiron without adjusting the thermostat control.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. In an electrical heating apparatus, the combination of an electrically energized heating element, a thermostat in heat conducting relation thereto, switching means associated with the said thermostat for controlling the said heating element, heat insulating means between said thermostat and said heating element and manually adjustable means variably controlling the rate of heat conduction from said element to said thermostat, said last-named means comprising a rotatable member formed of heat-conducting material, and an arm on said member adapted to be brought into greater or less degree of juxtaposition with said heating element as said member is rotated.

2. In an electric sadiron which has a base member having a recess therein and a thermostat within the recess and a heating member juxtaposed to said base member, means conducting heat at varying rates from said heater to said thermostat comprising a rotatable stem and an arm on said stem adapted to be brought into greater and less degrees of juxtaposition with said heater as said stem is rotated.

In testimony whereof, I have signed my name to this specification this 26th day of November, 1930.

JOHN A. SPENCER.